United States Patent
Li et al.

(10) Patent No.: US 10,902,721 B2
(45) Date of Patent: Jan. 26, 2021

(54) ROAD PROJECTING METHOD AND SYSTEM FOR TRAFFIC LIGHT

(71) Applicant: IE-Cheng Technology (TIANJIN) Co., Ltd., Tianjin (CN)

(72) Inventors: Xiangying Li, Tianjin (CN); Xuelian Jiao, Tianjin (CN)

(73) Assignee: IE-Cheng Technology (TIANJIN) Co., Ltd., Tianjin (CN)

( * ) Notice: Subject to any disclaimer, the term of this patent is extended or adjusted under 35 U.S.C. 154(b) by 0 days.

(21) Appl. No.: 16/609,289

(22) PCT Filed: Nov. 24, 2017

(86) PCT No.: PCT/CN2017/112804
§ 371 (c)(1),
(2) Date: Oct. 29, 2019

(87) PCT Pub. No.: WO2019/056559
PCT Pub. Date: Mar. 28, 2019

(65) Prior Publication Data
US 2020/0058221 A1    Feb. 20, 2020

(30) Foreign Application Priority Data
Sep. 25, 2017    (CN) .......................... 2017 1 0874079

(51) Int. Cl.
*G08G 1/095*    (2006.01)
*G08G 1/052*    (2006.01)
*G08G 1/08*    (2006.01)

(52) U.S. Cl.
CPC ............. *G08G 1/095* (2013.01); *G08G 1/052* (2013.01); *G08G 1/08* (2013.01)

(58) Field of Classification Search
CPC ........... G08G 1/095; G08G 1/07; G08G 1/052
See application file for complete search history.

(56) References Cited

U.S. PATENT DOCUMENTS

2015/0262483 A1* 9/2015 Sugawara ........ G08G 1/096783
340/929
2016/0259814 A1* 9/2016 Mizoguchi ............ G06F 16/215
(Continued)

FOREIGN PATENT DOCUMENTS

CN    101187191 A    5/2008
CN    101833863 A    9/2010
(Continued)

OTHER PUBLICATIONS

International Search Report issued in PCT/CN2017/112804 dated Jun. 27, 2018.

*Primary Examiner* — Hongmin Fan
(74) *Attorney, Agent, or Firm* — Troutman Pepper Hamilton Sanders LLP; Christopher C. Close, Jr.

(57) ABSTRACT

Disclosed is a road projecting method and system for a traffic light. A passable region and an impassable region are determined according to a current state and a time period of the traffic light and a preset travelling speed of a vehicle; on a map, the passable region is displayed in a first manner, and the impassable region is displayed in a second manner; and the first manner is different from the second manner. The road projecting method and system for a traffic light provided by the present invention divides the road on which the vehicle is running into the passable region and the impassable region on the map, and the passable region and the impassable region are displayed in different manners, thereby avoiding congestion caused by stop of a large number of vehicles close to the intersection and improving the traffic efficiency.

14 Claims, 3 Drawing Sheets

(56) References Cited

U.S. PATENT DOCUMENTS

2018/0082583 A1* 3/2018 Fujii ................ G08G 1/096783
2018/0091439 A1* 3/2018 Zhang ................ G08G 1/0145

FOREIGN PATENT DOCUMENTS

| CN | 102254442 A | 11/2011 |
| CN | 104851305 A | 8/2015 |
| WO | 2015177864 A1 | 4/2017 |

* cited by examiner

ROAD PROJECTING METHOD AND SYSTEM FOR TRAFFIC LIGHT

This application claims priority to Chinese Patent Application No. 201710874079.4 filed with the Chinese Patent Office on Sep. 25, 2017 and entitled "ROAD PROJECTING METHOD AND SYSTEM FOR TRAFFIC LIGHT", which is incorporated herein by reference in its entirety.

TECHNICAL FIELD

The present invention relates to the field of traffic technologies, and in particular, to a road projecting method and system for a traffic light.

BACKGROUND

At present, the speedometer of a vehicle displays the current speed in real time, so the driver can adjust the speed only according to the current road conditions (for example, whether a vehicle on the current road section generates an accident or not, and so on) and the driving experience to avoid the red light as far as possible. However, since the driver does not know the display situation of the traffic light at the intersection ahead, the driver can only adjust the speed when getting close to the traffic light at the intersection ahead, where the adjustment time is short, and adjustment conditions are restricted, so it is easy to cause vehicle stop at the intersection, congestion and the like. Moreover, the vehicle needs to reaccelerate after the stop, thereby causing slow speed, long dredging time and high energy consumption when the vehicle passes through the intersection.

SUMMARY

An objective of the present invention is to provide a road projecting method and system for a traffic light, which can adjust the running speed of a vehicle to ensure that the vehicle pass through a traffic intersection when the green light is on according to the current state of the traffic light, so as to avoid traffic congestion caused by stop of the vehicle and be capable of increasing the number of passing vehicles per unit time.

To achieve the above purpose, the present invention provides the following technical solutions.

A road projecting method for a traffic light includes:

acquiring a current state and a time period of a traffic light on a road, where the time period is a time for one alternative change of a passable signal and an impassable signal;

determining a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road;

displaying the passable region on the road of a map in a first manner; and displaying the impassable region on the road of the map in a second manner, where the first manner is different from the second manner.

Optionally, the step of determining a passable region and an impassable region of a vehicle travelling on the road according to the current state and the time period of the traffic light and a preset travelling speed of a vehicle specifically includes:

determining a projection period region according to the following formula: the projection period region=the preset speed*the time period;

determining a distance remainder according to the following formula: the distance remainder=a distance % the projection period region, where % indicates a remainder operation, and the distance indicates a distance from any point on the road to the traffic light;

determining whether the distance remainder is less than a first distance or greater than a second distance, to obtain a determining result, where the first distance=a remaining time of the current state of the traffic light*the preset speed; the second distance=(the remaining time of the current state of the traffic light+a first time)*the preset speed, the first time indicating a duration of the next state of the current state of the traffic light;

determining a corresponding point on the road to be a corresponding projection region of the current state of the traffic light when the determining result indicates that the distance remainder is less than the first distance or greater than the second distance, where the corresponding point on the road is determined to be the passable region when the current state of the traffic light is the passable signal, and the corresponding point on the road is determined to be the impassable region when the current state of the traffic light is the impassable signal; and determining the corresponding point on the road to be an opposite projection region of the corresponding projection region of the current state of the traffic light when the determining result indicates that the distance remainder is greater than or equal to the first distance and less than or equal to the second distance, where the corresponding point on the road is determined to be the impassable region when the current state of the traffic light is the passable signal, and the corresponding point on the road is determined to be the passable region when the current state of the traffic light is the impassable signal.

Optionally, the step of displaying the passable region in a first manner specifically includes: displaying the passable region with a first color.

Optionally, the step of displaying the impassable region on the road of the map in a second manner specifically includes:

displaying the impassable region with a second color.

Optionally, the road projecting method further includes: displaying a current position of the vehicle on the map.

Optionally, the road projecting method further includes: providing voice prompt according to the projection region of the current position of the vehicle, the speed of the vehicle and the preset speed.

Optionally, the passable signal includes a green light and a yellow light, and the impassable signal includes a red light.

Optionally, the passable signal includes a green light, and the impassable signal includes a red light and a yellow light.

Optionally, the passable region is displayed in green.

Optionally, the impassable region is displayed in red.

A road projecting system for a traffic light includes:

an acquiring module used for acquiring a current state and a time period of a traffic light on a road, where the time period is a time for one alternative change of a passable signal and an impassable signal;

a passable region and impassable region determining module used for determining a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road;

a first display module used for displaying the passable region on the map in a first manner; and a second display module used for displaying the impassable region on the road of the map in a second manner, where the first manner is different from the second manner.

Optionally, the passable region and impassable region determining module specifically includes:

a projection period region determining unit used for determining a projection period region according to the following formula: the projection period region=the preset speed*the time period;

a distance remainder determining unit used for determining a distance remainder according to the following formula: the distance remainder=a distance % the projection period region, where % indicates a remainder operation, and the distance indicates a distance from any point on the road to the traffic light;

a determining unit used for determining whether the distance remainder is less than a first distance or greater than a second distance, to obtain a determining result, where the first distance=a remaining time of the current state of the traffic light*the preset speed; the second distance=(the remaining time of the current state of the traffic light+a first time)*the preset speed, the first time indicating a duration of the next state of the current state of the traffic light;

a first determining unit used for determining a corresponding point on the road to be a corresponding projection region of the current state of the traffic light when the determining result indicates that the distance remainder is less than the first distance or greater than the second distance, where the corresponding point on the road is determined to be the passable region when the current state of the traffic light is the passable signal, and the corresponding point on the road is determined to be the impassable region when the current state of the traffic light is the impassable signal; and a second determining unit used for determining the corresponding point on the road to be an opposite projection region of the corresponding projection region of the current state of the traffic light when the determining result indicates that the distance remainder is greater than or equal to the first distance and less than or equal to the second distance, where the corresponding point on the road is determined to be the impassable region when the current state of the traffic light is the passable signal, and the corresponding point on the road is determined to be the passable region when the current state of the traffic light is the impassable signal.

Optionally, the first display module is specifically used for displaying the passable region by utilizing a first color.

Optionally, the second display module is specifically used for displaying the impassable region by utilizing a second color.

Optionally, the road projecting system further includes:

a third display module used for displaying a current position of the vehicle on the map.

Optionally, the road projecting system further includes:

a voice prompt module used for providing voice prompt according to the projection region of the current position of the vehicle, the speed of the vehicle and the preset speed.

Compared with the prior art, the present invention has the following advantages:

according to the road projecting method and system for a traffic light provided by the present invention, a passable region and an impassable region are determined according to a current state and a time period of the traffic light and a preset travelling speed of a vehicle; on a map, the passable region is displayed in a first manner, and the impassable region is displayed in a second manner; and the first manner is different from the second manner. The road projecting method and system for a traffic light provided by the present invention divides the road on which the vehicle is running into the passable region and the impassable region on the map, and the passable region and the impassable region are displayed in different manners; therefore, when a driver is farther from the traffic light, the driver can know in advance the state of the traffic light when the vehicle runs to the intersection, thereby avoiding congestion caused by stop of a large number of vehicles close to the intersection and improving the traffic efficiency.

BRIEF DESCRIPTION OF THE DRAWINGS

The present invention will be further illustrated with reference to the accompanying drawings.

DETAILED DESCRIPTION

The following describes the technical solutions in the embodiments of the present invention in detail with reference to the accompanying drawings in the embodiments of the present invention. Apparently, the described embodiments are merely a part rather than all of the embodiments of the present invention. All other embodiments obtained by a person of ordinary skill in the art without creative efforts on the basis of the embodiments of the present invention shall fall within the protection scope of the present invention.

Embodiment 1

Figure 1:
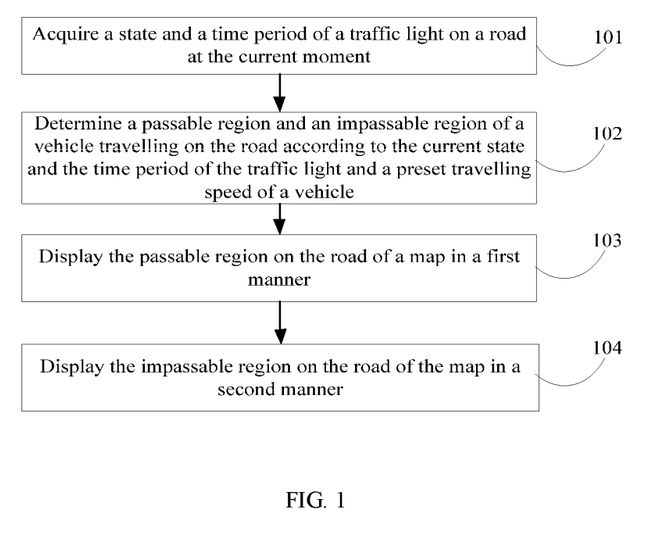
FIG. 1 is a flowchart of Embodiment 1 of a road projecting method for a traffic light according to the present invention.

The present invention provides a road projecting method for a traffic light. FIG. 1 is a flowchart of Embodiment 1 of a road projecting method for a traffic light according to the present invention. As shown in FIG. 1, the road projecting method for a traffic light includes the following steps:

Step 101: acquire a state and a time period of a traffic light on a road at the current moment, where the time period is a time for one alternative change of a passable signal and an impassable signal, and the passable signal is as the start of one time period. The current state of the traffic light at the current moment includes a color of the traffic light and a remaining time of the current traffic light. Specifically, the passable signal includes a green light and a yellow light, and the impassable signal includes a red light; or the passable signal includes a green light, and the impassable signal includes a red light and a yellow light.

Step 102: determine a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road.

Step 103: display the passable region on the road of a map in a first manner.

Step 104: display the impassable region on the road of the map in a second manner, where the first manner is different from the second manner. Optionally, the passable region and the impassable region can be distinguished by using different colors, for example, the passable region is displayed in green, and the impassable region is displayed in red.

According to the road projecting method for a traffic light provided by Embodiment 1 of the present invention, the passable region and the impassable region are determined according to the current state and the time period of the traffic light and the preset speed; on the map, the passable region is displayed in the first manner, and the impassable region is displayed in the second manner; and the first manner is different from the second manner. The road projecting method and system for a traffic light provided by the present invention divides the road on which the vehicle is running into the passable region and the impassable region on the map, and the passable region and the impassable region are displayed in different manners; therefore, when a driver is farther from the traffic light, the driver can know in advance the state of the traffic light when the vehicle runs to the intersection, thereby avoiding congestion caused by stop of a large number of vehicles close to the intersection and improving the traffic efficiency.

Embodiment 2

Figure 2:
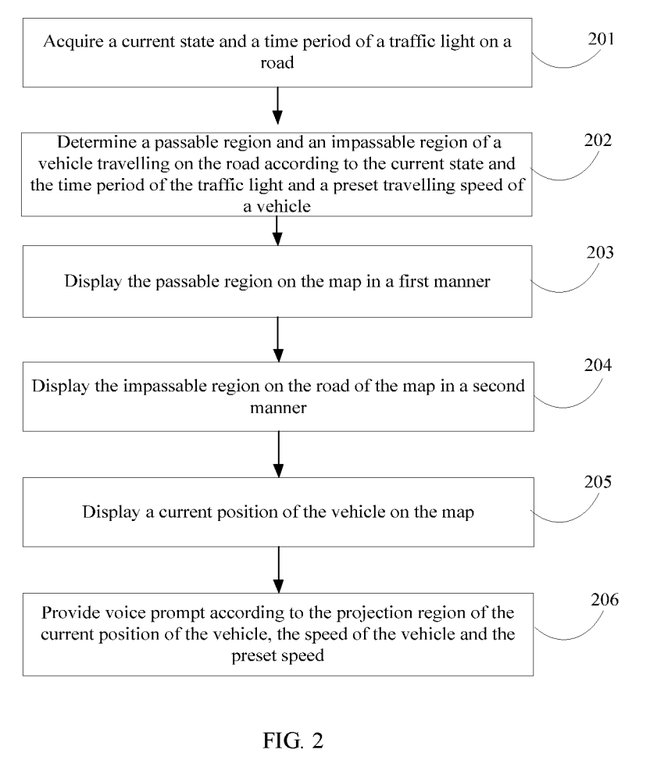
FIG. 2 is a flowchart of Embodiment 2 of a road projecting method for a traffic light according to the present invention.

FIG. 2 is a flowchart of Embodiment 2 of a road projecting method for a traffic light according to the present invention. As shown in FIG. 2, the road projecting method for a traffic light includes the following steps:

Step 201: acquire a current state and a time period of a traffic light on a road, where the time period is a time for one alternative change of a passable signal and an impassable signal.

Step 202: determine a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; the impassable region indicates that the corresponding traffic signal is the impassable signal when the vehicle travelling in the impassable region reaches a traffic light intersection on the road. The specific steps are as follows:

Step A1: determine a projection period region according to the following formula: the projection period region=the preset speed*the time period;

Step A2: determine a distance remainder according to the following formula: the distance remainder=a distance % the projection period region, where % indicates a remainder operation, and the distance indicates a distance from any point on the road to the traffic light; and the distance remainder obtained according to the formula is less than the projection period region;

Step A3: determine whether the distance remainder is less than a first distance or greater than a second distance, to obtain a determining result, where the first distance=a remaining time of the current state of the traffic light*the preset speed; the second distance=(the remaining time of the current state of the traffic light+a first time)*the preset speed, the first time indicating a duration of the next state of the current state of the traffic light. For example, if the current state of the current traffic light is the passable signal, the second distance=(the remaining time of the passable signal+a duration of the impassable signal)*the preset speed, where the preset speed is an artificially set value, can be a road limited speed and can also be a current speed of the vehicle;

Step A4: determine a corresponding point on the road to be a corresponding projection region of the current state of the traffic light when the determining result indicates that the distance remainder is less than the first distance or greater than the second distance, where the corresponding point on the road is determined to be the passable region when the current state of the traffic light is the passable signal, and the corresponding point on the road is determined to be the impassable region when the current state of the traffic light is the impassable signal; and Step A5: determine the corresponding point on the road to be an opposite projection region of the corresponding projection region of the current state of the traffic light when the determining result indicates that the distance remainder is greater than or equal to the first distance and less than or equal to the second distance, where the corresponding point on the road is determined to be the impassable region when the current state of the traffic light is the passable signal, and the corresponding point on the road is determined to be the passable region when the current state of the traffic light is the impassable signal.

Step 203: display the passable region on the map in a first manner.

Step 204: display the impassable region on the road of the map in a second manner, where the first manner is different from the second manner. The projection region of the traffic light is displayed on the road through a vehicle navigation system.

Step 205: display a current position of the vehicle on the map, such as display a round spot.

Step 206: provide voice prompt according to the projection region of the current position of the vehicle, the speed of the vehicle and the preset speed. The specific steps are as follows:

when the preset speed is the road limited speed, determine whether the current speed of the vehicle is overspeed if the vehicle is travelling in the passable region; if no, provide the voice prompt on the driver to drive at the current speed of the vehicle in order to ensure that the vehicle is always in the passable region; if yes, provide the voice prompt on the driver to decelerate; determine whether the current speed of the vehicle is overspeed if the vehicle is travelling in the impassable region; if yes, provide the voice prompt on the driver to decelerate; and if no, provide the voice prompt on the driver to accelerate.

when the preset speed is the current speed of the vehicle, determine whether the current speed of the vehicle is overspeed if the vehicle is travelling in the passable region; if no, provide the voice prompt on the driver to drive at the current speed of the vehicle in order to ensure that the vehicle is always in the passable region; if yes, provide the voice prompt on the driver to decelerate; determine whether the current speed of the vehicle is overspeed if the vehicle is travelling in the impassable region; if yes, provide the voice prompt on the driver to decelerate; and if no, provide the voice prompt on the driver to accelerate.

Optionally, the preset speed and the current speed of the vehicle can be displayed on the map in real time.

According to the road projecting method for a traffic light provided by Embodiment 2 of the present invention, the passable region and the impassable region are determined according to the current state and the time period of the traffic light and the preset speed; on the map, the passable region is displayed in the first manner, and the impassable region is displayed in the second manner; and the first manner is different from the second manner. Furthermore, the passable region and the impassable region are displayed on the map, and the position of the vehicle is also displayed on the map; and the voice prompt is provided for the driver according to the speed of the vehicle and the preset speed on the basis that the current running position of the vehicle is travelling in the passable region or the impassable region. The road projecting method and system for a traffic light provided by the present invention divides the road on which the vehicle is running into the passable region and the impassable region on the map, and the passable region and the impassable region are displayed in different manners; therefore, when a driver is farther from the traffic light, the driver can know in advance the state of the traffic light when the vehicle runs to the intersection, thereby avoiding congestion caused by stop of a large number of vehicles close to the intersection and improving the traffic efficiency.

Corresponding to the road projecting method for a traffic light, the present invention further provides a road projecting system for a traffic light and provides two embodiments for explaining it. The specific embodiments are as follows:

Embodiment 3

Figure 3:
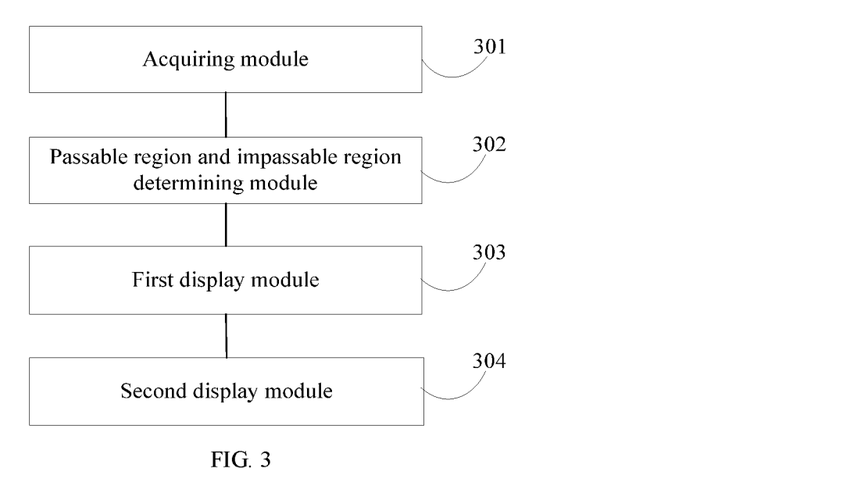
FIG. 3 is a structure connection diagram of Embodiment 3 of a road projecting system for a traffic light according to the present invention.

FIG. 3 is a structure connection diagram of Embodiment 3 of a road projecting system for a traffic light according to the present invention. As shown in FIG. 3, the road projecting system for a traffic light includes:

an acquiring module 301 used for acquiring a current state and a time period of a traffic light on a road, where the time period is a time for one alternative change of a passable signal and an impassable signal, and the passable signal is as the start of one time period. The current state of the traffic light at the current moment includes a color of the traffic light and a remaining time of the current traffic light. Specifically, the passable signal includes a green light and a yellow light, and the impassable signal includes a red light; or the passable signal includes a green light, and the impassable signal includes a red light and a yellow light.

a passable region and impassable region determining module 302 used for determining a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road.

a first display module 303 used for displaying the passable region on the map in a first manner.

a second display module 304 used for displaying the impassable region on the road of the map in a second manner, where the first manner is different from the second manner.

According to the road projecting system for a traffic light provided by Embodiment 3 of the present invention, the passable region and the impassable region are determined according to the current state and the time period of the traffic light and the preset speed; on the map, the passable region is displayed in the first manner, and the impassable region is displayed in the second manner; and the first manner is different from the second manner. The road projecting method and system for a traffic light provided by the present invention divides the road on which the vehicle is running into the passable region and the impassable region on the map, and the passable region and the impassable region are displayed in different manners; therefore, when a driver is farther from the traffic light, the driver can know in advance the state of the traffic light when the vehicle runs to the intersection, thereby avoiding congestion caused by stop of a large number of vehicles close to the intersection and improving the traffic efficiency.

Embodiment 4

Figure 4:
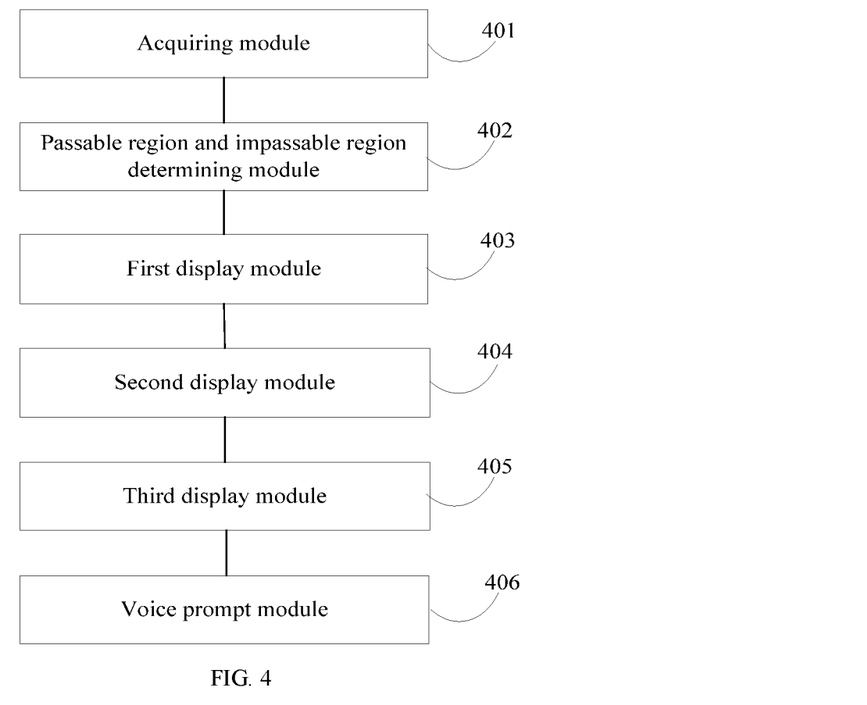
FIG. 4 is a structure connection diagram of Embodiment 4 of a road projecting system for a traffic light according to the present invention.

FIG. 4 is a structure connection diagram of Embodiment 4 of a road projecting system for a traffic light according to the present invention. As shown in FIG. 4, the road projecting system for a traffic light includes:

an acquiring module 401 used for acquiring a current state and a time period of a traffic light on a road, where the time period is a time for one alternative change of a passable signal and an impassable signal.

a passable region and impassable region determining module 402 used for determining a passable region and an impassable region of a vehicle travelling on the road according to the current state and the time period of the traffic light and a preset travelling speed of a vehicle, where the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road. The following is specifically included:

a projection period region determining unit used for determining a projection period region according to the following formula: the projection period region=the preset speed*the time period;

a distance remainder determining unit used for determining a distance remainder according to the following formula: the distance remainder=a distance % the projection period region, where % indicates a remainder operation, and the distance indicates a distance from any point on the road to the traffic light.

a determining unit used for determining whether the distance remainder is less than a first distance or greater than a second distance, to obtain a determining result, where the first distance=a remaining time of the current state of the traffic light*the preset speed; the second distance=(the remaining time of the current state of the traffic light+a first time)*the preset speed, the first time indicating a duration of the next state of the current state of the traffic light.

a first determining unit used for determining a corresponding point on the road to be a corresponding projection region of the current state of the traffic light when the determining result indicates that the distance remainder is less than the first distance or greater than the second distance, where the corresponding point on the road is determined to be the passable region when the current state of the traffic light is the passable signal, and the corresponding point on the road is determined to be the impassable region when the current state of the traffic light is the impassable signal.

a second determining unit used for determining the corresponding point on the road to be an opposite projection region of the corresponding projection region of the current state of the traffic light when the determining result indicates that the distance remainder is greater than or equal to the first distance and less than or equal to the second distance, where the corresponding point on the road is determined to be the impassable region when the current state of the traffic light is the passable signal, and the corresponding point on the road is determined to be the passable region when the current state of the traffic light is the impassable signal.

a first display module 403 used for displaying the passable region on the map in a first manner. Optionally, the first display module 403 is specifically used for displaying the passable region with a first color.

a second display module 404 used for displaying the impassable region on the road of the map in a second manner, where the first manner is different from the second manner. Optionally, the second display module 404 is specifically used for displaying the impassable region with a second color.

a third display module 405 used for displaying a current position of the vehicle on the map.

a voice prompt module 406 used for providing voice prompt according to the projection region of the current position of the vehicle, the speed of the vehicle and the preset speed, specifically, when the preset speed is the road limited speed, determining whether the current speed of the vehicle is overspeed if the vehicle is travelling in the passable region; if no, providing the voice prompt on the driver to drive at the current speed of the vehicle in order to ensure that the vehicle is always in the passable region; if yes, providing the voice prompt on the driver to decelerate; determining whether the current speed of the vehicle is overspeed if the vehicle is travelling in the impassable region; if yes, providing the voice prompt on the driver to decelerate; and if no, providing the voice prompt on the driver to accelerate;

when the preset speed is the current speed of the vehicle, determining whether the current speed of the vehicle is overspeed if the vehicle is travelling in the passable region; if no, providing the voice prompt on the driver to drive at the current speed of the vehicle in order to ensure that the vehicle is always in the passable region; if yes, providing the voice prompt on the driver to decelerate; and determining whether the current speed of the vehicle is overspeed if the vehicle is travelling in the impassable region; if yes, providing the voice prompt on the driver to decelerate; and if no, providing the voice prompt on the driver to accelerate.

According to the road projecting system for a traffic light provided by Embodiment 4 of the present invention, the passable region and the impassable region are determined according to the current state and the time period of the traffic light and the preset speed; on the map, the passable region is displayed in the first manner, and the impassable region is displayed in the second manner; and the first manner is different from the second manner. Furthermore, the passable region and the impassable region are displayed on the map, and the position of the vehicle is also displayed on the map; and the voice prompt is provided for the driver according to the speed of the vehicle and the preset speed on the basis that the current running position of the vehicle is travelling in the passable region or the impassable region. The road projecting method and system for a traffic light provided by the present invention divides the road on which the vehicle is running into the passable region and the impassable region on the map, and the passable region and the impassable region are displayed in different manners; therefore, when a driver is farther from the traffic light, the driver can know in advance the state of the traffic light when the vehicle runs to the intersection, thereby avoiding congestion caused by stop of a large number of vehicles close to the intersection and improving the traffic efficiency.

Figure 5:
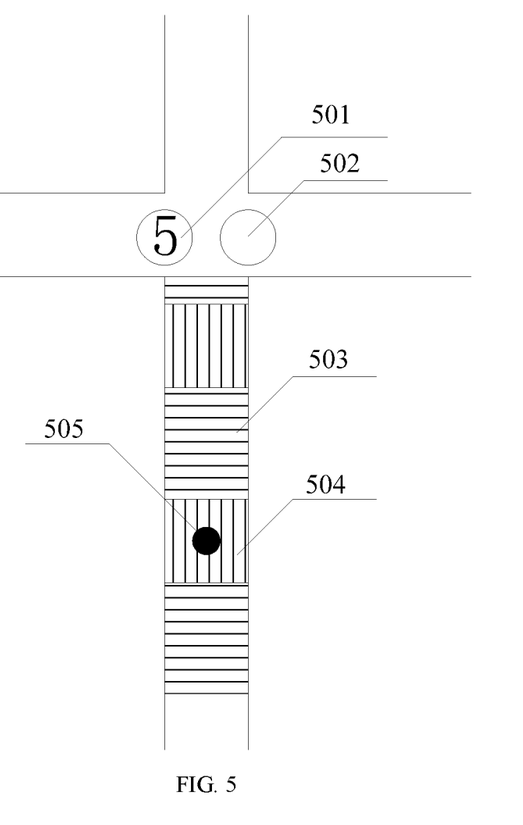
FIG. 5 is a schematic diagram of a specific embodiment of application of the present invention to a map.

The road projecting system for a traffic light provided by Embodiment 3 and Embodiment 4 of the present invention can be independently used, and can also be used in combination with the vehicle navigation system, which can be adaptively adjusted according to requirements of customers. FIG. 5 is a schematic diagram of a specific embodiment of application of the present invention to a map. As shown in FIG. 5, the current state of the traffic light is a passable signal light 501, and its remaining time is 5 s. The time period of the traffic light is 35 s, where the time of the passable signal light 501 is 20 s, the time of an impassable signal light 502 is 15 s, and the preset speed is 60 km/h. Projection of the traffic light on the road includes a passable region 503 and an impassable region 504, and a vehicle 505 is also displayed on the road. As shown in FIG. 5, the vehicle 505 is travelling in the impassable region, and at this time, the driver is prompted to accelerate or decelerate according to the speed of the vehicle 505, the preset speed and the road limited speed in order to ensure that the vehicle passes through the signal light intersection ahead at a passable signal light state.

The embodiments of the present invention are described in detail above with reference to the accompanying drawings, but the present invention is not limited to the above embodiments. Within the knowledge of a person of ordinary skill in the art, various variations can also be made without departing from the spirit of the present invention.

What is claimed is:

1. A road projecting method for a traffic light, wherein the road projecting method comprises:
    acquiring a current state and a time period of a traffic light on a road, wherein the time period is a time for one alternative change of a passable signal and an impassable signal;
    determining a passable region and an impassable region of a vehicle travelling on the road according to the current state and the time period of the traffic light and a preset travelling speed of a vehicle, wherein the passable region indicates that a corresponding traffic signal is the passable signal when the vehicle travelling in the passable region reaches a traffic light intersection on the road; and the impassable region indicates that the corresponding traffic signal is the impassable signal when the vehicle travelling in the impassable region reaches a traffic light intersection on the road;

wherein determining the passable region and the impassable region according to the current state and the time period of the traffic light and a preset speed of a vehicle specifically comprises:

determining a projection period region according to the following formula: the projection period region=the preset speed*the time period;

determining a distance remainder according to the following formula: the distance remainder=a distance % the projection period region, wherein % indicates a remainder operation, and the distance indicates a distance from any point on the road to the traffic light;

determining whether the distance remainder is less than a first distance or greater than a second distance, to obtain a determining result, wherein the first distance=a remaining time of the current state of the traffic light*the preset speed; the second distance=(the remaining time of the current state of the traffic light+a first time)*the preset speed, the first time indicating a duration of the next state of the current state of the traffic light;

determining a corresponding point on the road to be a corresponding projection period region of the current state of the traffic light when the determining result indicates that the distance remainder is less than the first distance or greater than the second distance, wherein the corresponding point on the road is determined to be the passable region when the current state of the traffic light is the passable signal, and the corresponding point on the road is determined to be the impassable region when the current state of the traffic light is the impassable signal; and determining the corresponding point on the road to be an opposite projection period region of the corresponding projection period region of the current state of the traffic light when the determining result indicates that the distance remainder is greater than or equal to the first distance and less than or equal to the second distance, wherein the corresponding point on the road is determined to be the impassable region when the current state of the traffic light is the passable signal, and the corresponding point on the road is determined to be the passable region when the current state of the traffic light is the impassable signal;

displaying the passable region on the road of a map in a first manner; and displaying the impassable region on the road of the map in a second manner, wherein the first manner is different from the second manner.

2. The road projecting method for a traffic light according to claim 1, wherein the step of displaying the passable region in a first manner specifically comprises:

displaying the passable region with a first color.

3. The road projecting method for a traffic light according to claim 1, wherein the step of displaying the impassable region in a second manner specifically comprises:

displaying the impassable region with a second color.

4. The road projecting method for a traffic light according to claim 1, wherein the road projecting method further comprises:

displaying a current position of the vehicle on the map.

5. The road projecting method for a traffic light according to claim 1, wherein the road projecting method further comprises:

providing voice prompt according to the projection period region of a current position of the vehicle, the speed of the vehicle and the preset speed.

6. The road projecting method for a traffic light according to claim 1, wherein the passable signal comprises a green light and a yellow light, and the impassable signal comprises a red light.

7. The road projecting method for a traffic light according to claim 1, wherein the passable signal comprises a green light, and the impassable signal comprises a red light and a yellow light.

8. The road projecting method for a traffic light according to claim 2, wherein the passable region is displayed in green.

9. The road projecting method for a traffic light according to claim 3, wherein the impassable region is displayed in red.

10. A road projecting system for a traffic light, wherein the road projecting system comprises:

an acquiring module used for acquiring a current state and a time period of a traffic light on a road, wherein the time period is a time for one alternative change of a passable signal and an impassable signal;

a passable region and impassable region determining module used for determining a passable region and an impassable region of a vehicle travelling on the road according to the current state and the time period of the traffic light and a preset speed of a vehicle, wherein the passable region indicates that a corresponding traffic signal is the passable signal when the vehicle travelling in the passable region reaches a traffic light intersection on the road;

and the impassable region indicates that the corresponding traffic signal is the impassable signal when the vehicle travelling in the impassable region reaches a traffic light intersection on the road;

wherein the passable region and impassable region determining module specifically comprises:

a projection period region determining unit used for determining a projection period region according to the following formula: the projection period region=the preset speed*the time period;

a distance remainder determining unit used for determining a distance remainder according to the following formula: the distance remainder=a distance % the projection period region, wherein % indicates a remainder operation, and the distance indicates a distance from any point on the road to the traffic light;

a determining unit used for determining whether the distance remainder is less than a first distance or greater than a second distance, to obtain a determining result, wherein the first distance=a remaining time of the current state of the traffic light*the preset speed; the second distance=(the remaining time of the current state of the traffic light+a first time)*the preset speed, the first time indicating a duration of the next state of the current state of the traffic light;

a first determining unit used for determining a corresponding point on the road to be a corresponding projection period region of the current state of the traffic light when the determining result indicates that the distance remainder is less than the first distance or greater than the second distance, wherein the corresponding point on the road is determined to be the passable region when the current state of the traffic light is the passable signal, and the corresponding point on the road is determined to be the impassable region when the current state of the traffic light is the impassable signal; and a second determining unit used for determining the corresponding point on the road to be an opposite projection period region of the corresponding projection period region of the current state of the traffic light when the determining result indicates that the distance remainder is greater than or equal to the first distance and less than or equal to the second distance, wherein the corresponding point on the road is determined to be the impassable region when the current state of the traffic light is the passable signal, and the corresponding point on the road is determined to be the passable region when the current state of the traffic light is the impassable signal;

a first display module used for displaying the passable region on a map in a first manner; and a second display module used for displaying the impassable region on the road of the map in a second manner, wherein the first manner is different from the second manner.

11. The road projecting system for a traffic light according to claim 10, wherein the first display module is specifically used for displaying the passable region by utilizing a first color.

12. The road projecting system for a traffic light according to claim 10, wherein the second display module is specifically used for displaying the impassable region by utilizing a second color.

13. The road projecting system for a traffic light according to claim 10, wherein the road projecting system further comprises:

a third display module used for displaying a current position of the vehicle on the map.

14. The road projecting system for a traffic light according to claim 10, wherein the road projecting system further comprises:

a voice prompt module used for providing voice prompt according to the projection period region of a current position of the vehicle, a speed of the vehicle and the preset speed.

* * * * *

UNITED STATES PATENT AND TRADEMARK OFFICE
CERTIFICATE OF CORRECTION

Page 1 of 1

PATENT NO. : 10,902,721 B2
APPLICATION NO. : 16/609289
DATED : January 26, 2021
INVENTOR(S) : Xiangying Li and Xuelian Jiao It is certified that error appears in the above-identified patent and that said Letters Patent is hereby corrected as shown below:

On the Title Page

At item (30) Foreign Application Priority Data:
The Foreign Application Priority Number should correctly read 201710874079.4

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*